United States Patent Office 3,808,262
Patented Apr. 30, 1974

3,808,262
UREA DERIVATIVES
Bernd Zeeh, 3 Thorwaldsenstrasse, 6700 Ludwigshafen, Germany; Karl-Heinz Koenig, 8A Pierstrasse, 6710 Frankenthal, Germany; Hans Kiefer, 5 Im Sandgarten, 6706 Wachenheim, Germany; and Adolf Fischer, 43 Speyerer Strasse, 6704 Mutterstadt, Germany
No Drawing. Filed Jan. 22, 1971, Ser. No. 109,042
Claims priority, application Germany, Feb. 6, 1970,
P 20 05 326.3
Int. Cl. C07c 127/18
U.S. Cl. 260—471 A                8 Claims

ABSTRACT OF THE DISCLOSURE

New and valuable trisubstituted urea derivatives having a good herbicidal action and a process for controlling the growth of unwanted plants with these compounds.

---

The present invention relates to broad-spectrum herbicidal trisubstituted urea derivatives. It is known to use urea derivatives, e.g. N-(3-trifluoromethylphenyl)-N'-methyl-N'-(carbonylmethoxy)-urea, as herbicides; however, their action is unsatisfactory.

We have now found that urea derivatives of the formula

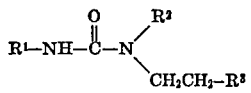

where $R^1$ denotes alkyl having 1 to 6 carbon atoms, monocyclic, bicyclic or tricyclic alkyl having 3 to 18 carbon atoms, or aryl (phenyl, naphthyl) which may bear one or more F, Cl, Br, I, trifluoromethyl, alkyl (methyl, ethyl, propyl, isopropyl, n-butyl, isobutyl, tert-butyl), alkoxy (methoxy, ethoxy, propoxy, isopropoxy, butoxy, isobutoxy, tert-butoxy), alkylthio (methylthio, ethylthio, propylthio, isopropylthio), hydroxy, thiocyano, cyano, methylsulfonyl or nitro substituents, $R^2$ denotes hydrogen, lower alkyl (methyl, ethyl, isopropyl) or cycloalkyl having 3 to 6 carbon atoms, and $R^3$ denotes a carboxy group, the salt of a carboxy group, an alkoxycarbonyl or aryloxycarbonyl group, or the group

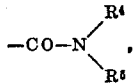

$R^4$ and $R^5$ denoting hydrogen or an aliphatic radical having 1 to 4 carbon atoms, have a good herbicidal action.

This action is particularly in evidence on *Sinapis arvensis*, *Stellaria media*, *Matricaria chamomilla* and *Echinochloa crus-galli* without damage being caused to crop plants, e.g., cereals (wheat, barley, rye, oats, Indian corn).

By salts we mean the alkali metal or alkaline earth metal salts, e.g. sodium, potassium, magnesium or calcium, or the ammonium salts or the salts of organic amines, e.g. the salts of dimethylamine, triethylamine, triethanolamine or ethanolamine.

The new active ingredients may be prepared for instance by reacting isocyanates with 2-alkylaminopropionic acid derivatives.

The preparation of the active ingredients illustrated by the following examples:

EXAMPLE 1

10 parts (by weight) of methyl 2-methylaminopropionate is dissolved in 50 parts of tetrahydrofuran; while stirring, 15.9 parts of 3-trifluoromethylphenyl isocyanate is slowly added. The temperature rises to about 50° C. The solution is then stirred for 2 hours and subsequently concentrated in vacuo. The oil obtained is treated with 10 parts of diisopropyl ether: 15.1 parts of N-(3-trifluoromethylphenyl)-N'-methyl-N'-(2-methoxycarbonylethyl)-urea crystallizes out and is suction filtered and dried. Melting point: 58° to 60° C.

The compound has the following structural formula:

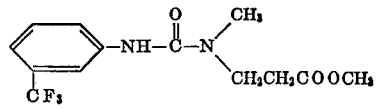

EXAMPLE 2

10 parts of methyl 2-methylaminopropionate is dissolved in 50 parts of tetrahydrofuran; while stirring, 16 parts of 3,4-dichlorophenyl isocyanate is slowly added. The temperature rises to about 50° C. The solution is stirred for 2 hours and then concentrated in vacuo. The residue is treated with 10 parts of diisopropyl ether: 2.12 parts of N-(3,4-dichlorophenyl)-N'-methyl-N'-(2-methoxycarbonylethyl)-urea crystallizes out and is suction filtered and dried. Melting point: 55° to 57° C.

The compounds has the following structural formula:

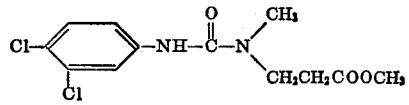

The following compounds may be obtained analogously:

| No. | $R^1$— | $R^2$— | $R^3$— | M.P. [° C.] |
|---|---|---|---|---|
| 1 | C₆H₅— | H— | —COOH | 164–166 |
| 2 | Cl—C₆H₄— | H— | —COOH | 190–192 |
| 3 | (3-Cl)C₆H₄— | H— | —COOH | 149–151 |
| 4 | (3,4-Cl₂)C₆H₃— | H— | —COOH | 154–156 |
| 5 | Br—C₆H₄— | H— | —COOH | 200–202 |

TABLE—Continued

| No. | R¹— | R²— | R³— | M.P. [° C.] |
|---|---|---|---|---|
| 6 | (phenyl with CF₃) | H— | —COOH | 136–138 |
| 7 | (phenyl with Cl) | (cyclohexyl) | —COOH | ¹ 130 |
| 8 | (2,3-dichlorophenyl) | Same | —COOH | ¹ 145 |
| 9 | (bicyclic/decalinyl) | CH₃ | —COOH | 130–132 |
| 10 | C₆H₅— | CH₃— | —COOH | 119–121 |
| 11 | (2,3-dichlorophenyl) | CH₃— | —COOH | 108–110 |
| 12 | (phenyl with CF₃) | CH₃— | —COOH | 122–124 |
| 13 | (CH₃S-, Cl-phenyl) | CH₃— | —COOH | 132–134 |
| 14 | F—(phenyl) | CH₃— | —COOH | 117–119 |
| 15 | CH₃O—(Cl-phenyl) | CH₃— | —COOH | 135 |
| 16 | (adamantyl) | CH₃— | —COOCH₃ | 111–112 |
| 17 | (2,3-dichlorophenyl) | CH₃— | —COOCH₃ | 55–57 |
| 18 | (phenyl with CF₃) | CH₃— | —COOCH₃ | 58–60 |
| 19 | Cl—(CH₃-phenyl) | CH₃— | —COOCH₃ | 60–26 |
| 20 | Br—(Cl-phenyl) | CH₃— | —COOCH₃ | 78–80 |
| 21 | CH₃O—(Cl-phenyl) | CH₃— | —COOCH₃ | 110 |
| 22 | (CH₃)₂CH— | CH₃— | —COOCH₃ | ² Oil |
| 23 | Br—(I-phenyl) | CH₃— | —COOH | 164–166 |

TABLE—Continued

| No. | R¹— | R²— | R³— | M.P. [° C.] |
|---|---|---|---|---|
| 24 | CH₃O—⟨phenyl-Cl⟩— | CH₃— | —COONa | 105 |
| 25 | ⟨naphthyl⟩ | CH₃— | —CONH₂ | 106–109 |
| 26 | ⟨phenyl-CF₃⟩— | CH₃— | —CONH₂ | 132–135 |
| 27 | CH₃S—⟨phenyl-Cl⟩— | CH₃— | —CONH₂ | 138–140 |
| 28 | F—⟨phenyl⟩— | CH₃— | —CONH₂ | 110 |
| 29 | NCS—⟨phenyl⟩— | CH₃— | —COOCH₃ | 86–88 |
| 30 | O—⟨phenyl⟩— | CH₃— | —COOCH₃ | 93–95 |
| 31 | ⟨naphthyl⟩ | CH₃— | —COOCH₃ | Oil |

¹ Decomposes.  ² $n_D^{25} = 1.4639$.

The herbicides according to the invention may be used as solutions, emulsions, suspensions or dusts. The form of application depends entirely on the purpose of which the agents are being used; in any case it should ensure a fine distribution of the active ingredient.

For the preparation of solutions to be sprayed direct, hydrocarbons having boiling points higher than 150° C., e.g. tetrahydronapthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such are dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

It is also possible to add insecticides, fungicides, bactericides and other herbicides.

The following example illustrates the use of the new compounds.

EXAMPLE 3

The plants Triticum aestivum, Avena sativa, Hordeum vulgare, Echionchloa crus-galli, Alopecurus myosuroides, Lolium perenne, Sinapis arvensis, Raphanus raphanistrum, Matricaria chamomilla and Stellaria media were treated at a growth height of 3 to 12 cm. with 1.5 kg. per hectare of each of the following active ingredients, each amount being dispersed in 500 liters of water per hectare:

(I) N-phenyl-N'-methyl-N'-(2-carboxylethyl)-urea;
(II) N-(3,4-dichlorophenyl)-N'-methyl-N'-(2-carboxylethyl)-urea;
(III) N-(3-trifluoromethylphenyl)-N'-methyl-N'-(2-carboxylethyl)-urea;

and, for comparison, (IV) 2-sec-butyl-4,6-dinitrophenyl acetate;
(V) N-(3-trifluoromethylphenyl)-N'-methyl-N'-(carbonylmethoxy)-urea.

After 3 weeks it was ascertained that active ingredients I, II and III had a better action on broadleaved and grassy weeds than IV and V, combined with the same good selectivity as IV and V.

The results of the experiment are given in the following table:

| | Active ingredient | | | | |
|---|---|---|---|---|---|
| | I | II | III | IV | V |
| Crop plants: | | | | | |
| Triticum aestivum | 0 | 0 | 0 | 0 | 0 |
| Avena sativa | 0 | 0 | 0 | 0 | 0 |
| Yordeum vulgare | 0 | 0 | 0 | 0 | 0 |
| Unwanted plants: | | | | | |
| Echinochloa crus-galli | 80 | 85 | 80 | 0 | 60 |
| Alopecurus myosuroides | 80 | 80 | 80 | 0 | 65 |
| Lolium perenne | 80 | 85 | 80 | 10 | 60 |
| Sinapis arvensis | 85 | 95 | 80 | 60 | 70 |
| Raphanus raphanistrum | 85 | 95 | 80 | 60 | 10 |
| Stellaria media | 85 | 90 | 80 | 55 | 65 |
| Matriacaria chamomilla | 95 | 95 | 95 | 75 | 75 |

NOTE.—0=no damage; 100=complete destruction.

The action of the following compounds corresponds to that of I, II, and III in Example 3:

N-(3-chloro-4-methylthiophenyl)-N'-methyl-N'-(2-carboxylethyl)-urea;

N-(4-fluorophenyl)-N'-methyl-N'-(2-carboxylethyl)-urea;

N-(3-chloro-4-bromophenyl)-N'-methyl-N'-(2-carboxylethyl)-urea;

N-(3-chloro-4-methoxyphenyl)-N'-methyl-N'-(2-carboxylethyl)-urea;
N-(3-trifluoromethylphenyl)-N'-methyl-N'-(2-methoxycarbonylethyl)-urea;
N-(3,4-dichlorophenyl)-N'-methyl-N'-(2-methoxycarbonylethyl)-urea;
N-(3-chloro-4-bromophenyl)-N'-methyl-N'-(2-methoxycarbonylethyl)-urea;
N-(2-methyl-4-chlorophenyl-N'-methyl-N'-(2-methoxycarbonylethyl)-urea;
N-(3-chloro-4-methoxyphenyl)N'methyl-N'(2-methoxycarbonylethyl)-urea;
N-cyclododecyl-N'-methyl-N'-(2-methoxycarbonylethyl)-urea;
N-(3-trifluoromethylphenyl)-N'-methyl-N'-(2-ethylcarboxyamido)-urea;
N-(4-fluorophenyl)-N'-methyl-N'-(2-ethylcarboxyamido)urea;
N-(3,4-dichlorophenyl)-N(-methyl-N'-(2-ethylcarboxyamido)-urea;
N-(3-chloro-4-methylthiophenyl)-N'-methyl-N'-(2-ethylcarboxyamido)-urea;
N-(3-hydroxyphenyl)-N'-methyl-N'-(2-methoxycarbonylethyl)-urea;
N-(4-chlorophenyl)-N'-methyl-N'-(2-methoxycarbonylethyl)-urea;
N-(3-chloro-4-methylthiophenyl)-N'-methyl-N'-(2-methoxycarbonylethyl)-urea.

EXAMPLE 4

70 parts by weight of Compound I from Example 3 is mixed with 30 parts by weight of N-methyl-α-pyrrolidone. A mixture is obtained which is suitable for application in the form of very fine drops.

EXAMPLE 5

20 parts by weight of Compound II from Example 3 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of Compound III from Example 3 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of Compound I from Example 3 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of Compound II from Example 3 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of Compound III from Example 3 is intimately mixed with 97 parts by weight of particulate kaolin. A dust is obtained containing 3% by weight of the active ingredient.

EXAMPLE 10

30 parts by weight of Compound I from Example 3 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A trisubstituted urea derivative of the formula

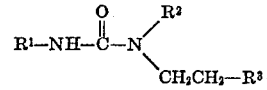

where $R^1$ denotes phenyl which may be substituted by F, Cl, Br, I, trifluoromethyl, alkyl, hydroxy, alkoxy, or nitro, $R^2$ denotes hydrogen, lower alkyl or cycloalkyl of 3–6 carbon atoms, and $R^3$ denotes a carboxy group, the salt of a carboxy group, or methoxycarbonyl.

2. N - phenyl - N' - methyl - N' - (2 - carboxylethyl)-urea.

3. N - (3,4 - dichlorophenyl) - N' - methyl - N'- (2-carboxylethyl)-urea.

4. N - (3 - trifluoromethylphenyl) - N' - methyl - N'-(2-carboxylethyl)-urea.

5. N - (3,4 - dichlorophenyl) - N' - methyl - N' - (2-methoxycarbonylethyl)-urea.

6. N - (3 - chloro - 4 - methoxyphenyl) - N' - methyl-N' - (2 - carboxylethyl) - urea.

7. A compound as claimed in claim 1 wherein $R^1$ denotes phenyl, or phenyl bearing at least one of F, Cl, Br, I, trifluoromethyl, alkyl of 1–4 carbon atoms, alkoxy having 1–4 carbon atoms, hydroxy, and nitro; $R^2$ denotes hydrogen, methyl, ethyl, isopropyl or cycloalkyl having 3–6 carbon atoms, and $R^3$ denotes carboxyl, an alkali metal or alkaline earth metal carboxyl salt or methoxycarbonyl.

8. A compound as claimed in claim 1 wherein $R^1$ denotes phenyl substituted with at least one of F, Cl, Br, $CF_3$, and $CH_3O$, $R^2$ denotes $CH_3$, and $R^3$ denotes COOH or $COOCH_3$.

References Cited
UNITED STATES PATENTS 3,705,173    12/1972    Adams et al. _____ 260—471 C LORRAINE A. WEINBERGER, Primary Examiner L. A. THAXTON, Assistant Examiner U.S. Cl. X.R.

71—98, 103, 104, 105, 106, 111, 113, 115, 119, 120; 260—465 D, 468 G, 468 J, 470, 482 R 501.11, 501.12, 514 G, 514 J, 516, 518 A, 518 R, 519, 534 R, 553 A, 553 R